United States Patent [19]
Grube et al.

[11] Patent Number: 5,835,485
[45] Date of Patent: Nov. 10, 1998

[54] METHOD FOR DYNAMIC ROUTING OF COMMUNICATION MESSAGES

[75] Inventors: Gary W. Grube, Barrington; Michael D. Sasuta, Mundelein; Robert William Furtaw, Lake Zurich, all of Ill.

[73] Assignee: Motorola, Inc., Schaumburg, Ill.

[21] Appl. No.: 561,683

[22] Filed: Nov. 22, 1995

[51] Int. Cl.⁶ .................................................. H04Q 7/28
[52] U.S. Cl. ................... 370/312; 340/825.47; 370/340; 370/401; 455/54.2
[58] Field of Search ..................................... 370/254, 310, 370/312, 327, 329, 340, 401, 402, 475; 379/63; 455/33.1, 53.1, 54.1, 54.2; 340/825.47, 825.52, 825.53

[56] References Cited

U.S. PATENT DOCUMENTS

| | | | |
|---|---|---|---|
| H1641 | 4/1997 | Sharman | 455/53.1 |
| 4,510,493 | 4/1985 | Bux et al. | 340/825.52 |
| 5,239,677 | 8/1993 | Jasinski | 455/54.2 |
| 5,345,474 | 9/1994 | Hoshikawa | 375/219 |
| 5,387,905 | 2/1995 | Grube et al. | 370/329 |
| 5,635,914 | 6/1997 | Petreye et al. | 340/825.47 |

*Primary Examiner*—Benedict V. Safourek
*Attorney, Agent, or Firm*—Wayne J. Egan

[57] ABSTRACT

To set-up a dispatch call, a controller identifies the destination units, destination sites, controlled devices and paths needed to support the call, and which LAN bridges will be used to create the communication paths. The controller then assigns the controlled devices a temporary address identical to the permanent address of one of the controlled devices, and then informs the LAN bridges which LAN ports should carry messages containing the temporary address. With all controlled devices having the same temporary address, and with the LAN bridges ready to pass messages containing the temporary address along a chosen path, the controlled device assigned to support the call request can transmit the messages generated by a source communication unit to other controlled devices using the temporary address. Thus, only one representation of a message produced by the source communication unit is transmitted from the assigned controlled device.

14 Claims, 4 Drawing Sheets

METHOD FOR DYNAMIC ROUTING OF COMMUNICATION MESSAGES

TECHNICAL FIELD

This application relates generally to communication systems and in particular to group dispatch call processing.

BACKGROUND OF THE INVENTION

The basic operation and structure of land mobile radio communication systems and cellular radio/telephone communication systems (generally, "communication systems") are known. Communication systems typically comprise a plurality of communication units—vehicle mounted or portable radios in a land mobile system and radio/telephones in a cellular system—a predetermined number of repeaters, which are located throughout a geographic region, that transceive information via communication channels, and a controller. Of the communication channels which may be TDM slots, carrier frequencies, a pair of carrier frequencies or other radio frequency ("RF") transmission medium, one typically acts as a control channel that transceives operational data between the plurality of communication units and the controller.

A fundamental difference between land mobile communication systems and cellular radio/telephone communication systems is the coverage area of each repeater. In a land mobile communication system, the coverage area of a single repeater may be up to a 48.28032 km (30 mile) radius, while the coverage area of a repeater in a cellular radio/telephone communication system is typically less than a 3.218688 km (2 mile) radius. The relatively large coverage area of a land mobile system allows the land mobile system to readily handle group, or dispatch calls. As known in the art, a group or dispatch call is one in which one communication channel is allocated to a group of communication units, each of which can communicate to the other units via the allocated channel. In contrast, the relatively small coverage area of the cellular radio/telephone communication system allows the system to efficiently process private, or point to point, calls. Also as known, a private call is one in which a communication channel is allocated to a small number of communication units, typically two, for a private communication. Although each system processes a particular type of call more efficiently, either system can perform a private call or a dispatch call.

In a land mobile communication system, the plurality of communication units are arranged into communication groups, or talk groups. A communication unit in a particular talk group may initiate a dispatch call by pressing a push-to-talk ("PTT") button which informs the controller that a communication channel is needed for this particular talk group. If a communication channel is available, the controller allocates it to the particular talk group and sends out a message on the control channel to the plurality of communication units. The communication units in the particular talk group, after receiving the message, affiliate themselves with the allocated communication channel such that each member of the particular talk group can participate in the dispatch call. The number of communication units in any one dispatch call could range from just a few communication units to a few hundred communication units.

As is also known, a communication system may serve a large population of communication units and comprise a plurality of repeater sites over a large geographic region. During a dispatch call, individual communication units of the particular talk group may be located anywhere in the multi-site coverage area of the system. To efficiently process the dispatch call, the system must be able to set-up the communication paths between the all the sites, or in the sites having a member of the particular talk group located within it, quickly.

A typical prior art multi-site communication system infrastructure comprises, within each repeater at each site, an individual circuit that couples the repeater to the controller or central radio system switching point ("central switching point"). At each site, at least one repeater is permanently connected to the central switching point. When a dispatch is initiated, the dedicated repeater in each site is automatically connected together such that all members of the talk group could partake in the dispatch call. By having a dedicated repeater at each site for dispatch calls, the set-up of communication paths between each site was relatively fast, however, the overall efficiency of the system is reduced due to the dedication of repeaters to only dispatch calls.

To eliminate the dedication of repeaters to dispatch calls, another typical prior art multi-site communication system incorporates a switching circuit that only links repeaters in sites that have at least one member of the dispatch call located within its coverage area. The linking of repeaters on a call by call basis improves the system's overall efficiency because all of a site's repeaters can be used for any type of call, including dispatch calls. However, set-up times are longer for this type of system as opposed to system having dedicated repeaters since circuit set-up is necessary for each call. Another drawback to this type of system, as well as to the dedicated repeater system, is that both systems require each repeater, via individual circuits, to be linked to the central switching point. Such architectures, which are commonly called single-star architectures, are costly and waste communication links in comparison with distributed tree-structures.

In a distributed tree-structure, paths are only required between repeater sites such that a path exists from any repeater to any other repeater. A distributed switching system eliminates the need for an individual circuit to connect each repeater with the central switching point, however, set-up times for dispatch calls are relatively long due to the multiple switching connections between sites that need to be made.

Distributed switching systems have proven to be relatively efficient at processing point-to-point communications. In such communications, a sending communication unit transmits, via the repeater site that it is located in, a data packet to the destination communication unit. The packet is transmitted from the repeater site of the sending communication unit through the distributed tree-structure to the repeater site of the receiving communication unit. For point-to-multipoint communications, the repeater site of the sending communication unit has to individually transmit the packet to each repeater site that has a receiving communication unit located within it or transmit the packet to all the repeaters simultaneously. In either case, the links that couple the repeater sites together are inefficiently used.

From the above, it is clear that a need exists for a multi-site communication system that provides for fast set-up of point-to-multipoint dispatch call connections between repeaters without requiring a single-star configuration.

One such communication system that addresses these needs is described in Gary Grube et al., "Multi-site group dispatch call method," U.S. Pat. No. 5,387,905, granted Feb. 7, 1995 (hereinafter "Grube"), wherein the processing of dispatch calls in a multi-site communication system begins when a source communication unit initiates a call request for a dispatch call. The call request is routed to a controller which assigns a controlled device to support the call request. In addition, the controller identifies the destination communication units, which site each of the destination units are in, and what controlled devices are needed to support the dispatch call. Having identified the controlled devices, the controller assigns all of the controlled devices needed the same temporary address. With all the controlled devices having the same temporary address, the controlled device assigned to support the call request can transmit the messages generated by the source communication unit to other controlled devices using the temporary address. Thus only one representation of a message produced by the source communication unit is transmitted from the assigned controlled device.

However, the method described in the aforementioned Grube patent requires that all of the controlled devices be capable of simultaneously operating with both a permanent network address and a temporary address. Such controlled devices are unique, more complicated and hence they may be more costly to deploy. In addition, since the method described in the aforementioned Grube patent makes use of permanent network addresses for each of the controlled devices and a pool of assignable addresses for use as temporary addresses for each active dispatch call, a very large total number of addresses may be required. A larger number of addresses increases the size of the address fields in the communication messages, and hence more transmission time of call control information is required. A well, the absolute limit of address numbers may be exceeded as the call traffic unpredictably peaks. It is possible to block new call traffic if there are not enough addresses available.

From the above, it is clear that a need exists for a multi-site communication system that provides for fast set-up of point-to-multipoint dispatch call connections between repeaters without requiring a single-star configuration. As well, a need exists to enable the construction of cost-effective networks using at least some controlled devices that are limited to operating with one address. Still further, a need exists to eliminate the potential to block new call traffic as a function of the number of network addresses available.

DESCRIPTION OF THE PREFERRED EMBODIMENT

Briefly, processing of dispatch calls in a multi-site communication system begins when a source communication unit initiates a call request for a dispatch call. The call request is routed to a controller which assigns a controlled device to support the call request. In addition, the controller identifies the destination communication units, what sites corresponding to the destination units, what controlled devices are needed to support the dispatch call, what communication paths will be used between the source communication unit and the destination communication units, and which LAN bridges will be used to create the communication paths. Having identified the controlled devices, the controller assigns all of the controlled devices a temporary address that is identical to the permanent address of just one of the controlled devices assigned to the dispatch call and the controller informs the LAN bridges which LAN ports should carry messages containing the temporary address. With all the controlled devices having the same temporary address, and with the LAN bridges ready to pass messages containing the temporary address along a chosen path, the controlled device assigned to support the call request can transmit the messages generated by the source communication unit to other controlled devices using the temporary address. Thus, only one representation of a message produced by the source communication unit is transmitted from the assigned controlled device. As well, no additional network addresses are required beyond the numbers permanently assigned to each device.

Figure 1:
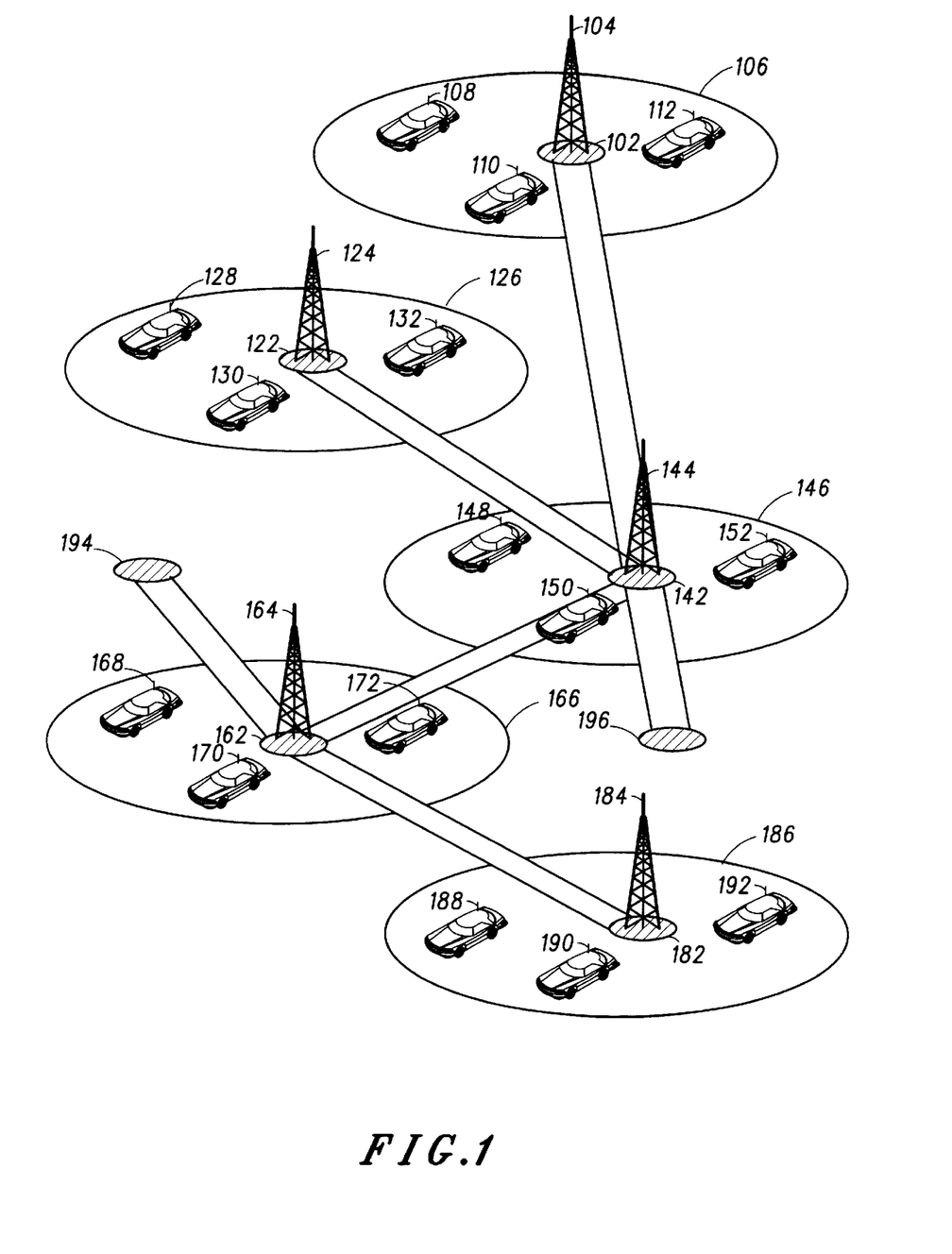
FIG. 1 shows a multi-site communication system that may be used to demonstrate the present invention.

Referring now to FIG. 1, there is depicted a multi-site communication system 100 that comprises a plurality of network nodes 102, 122, 142, 162, 182, 194 and 196, a plurality of vehicle mounted communication units 108, 110, 112, 128, 130, 132, 148, 150, 152, 168, 170, 172, 188, 190 and 192, a predetermined number of repeaters 104, 124, 144, 164 and 184, and a predetermined number of sites having respective coverage areas 106, 126, 146, 166 and 186. The network nodes are linked together in a non-star network, such that every node is connected to every other node, although not necessarily by a direct path. Further, some of the network nodes 102, 122, 142, 162 and 182 include radio repeaters to provide radio coverage areas, while some of the network nodes 194 and 196 do not. The network nodes without repeaters may be interconnected to consoles at dispatch centers which are not co-located at radio repeater sites, or they may simply be composed of a single call processing controller, or "controller".

Figure 2:
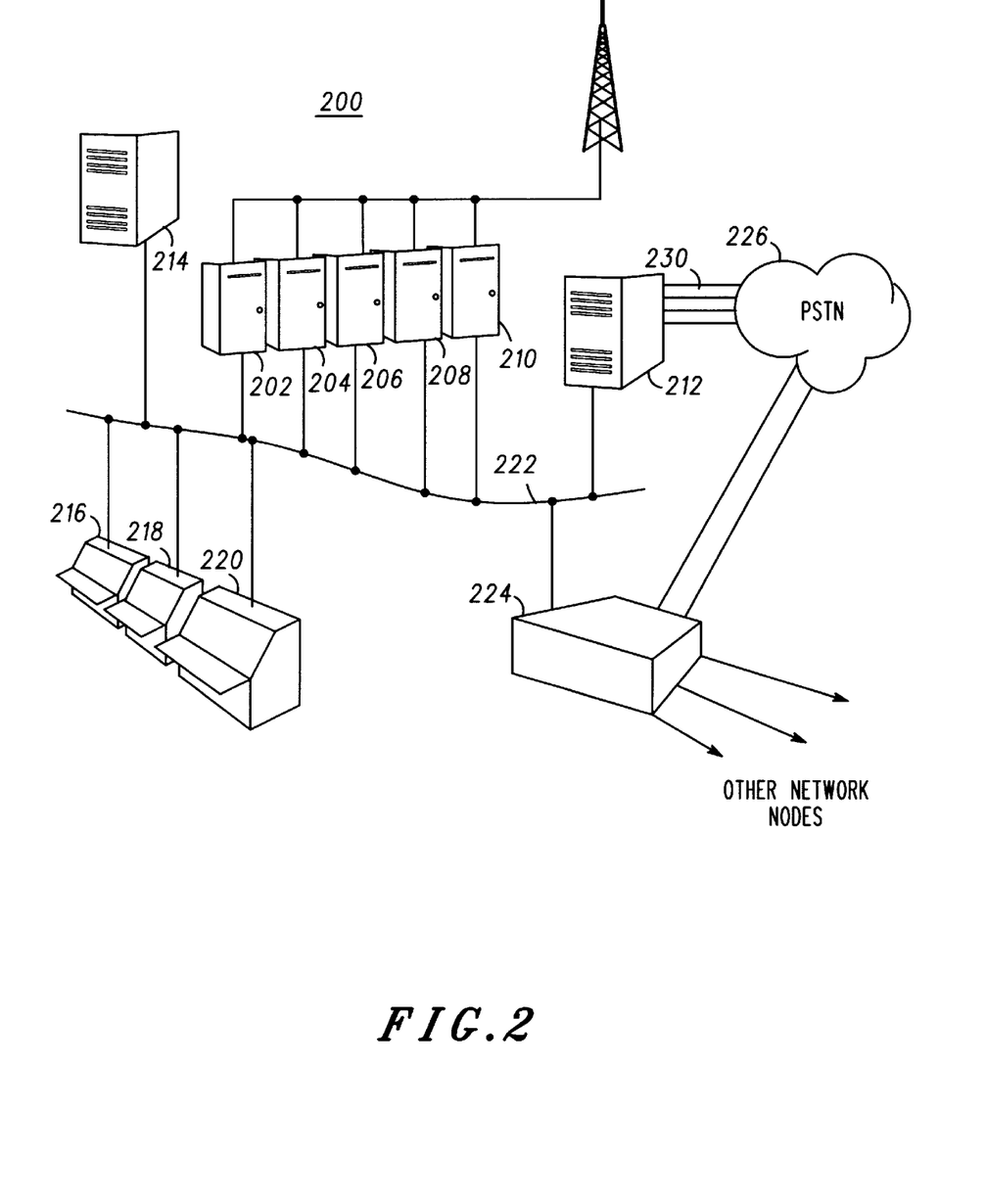
FIG. 2 shows a repeater site that may be used to demonstrate the present invention.

FIG. 2 illustrates a fully-equipped network node 200 comprising a predetermined number of repeaters 202, 204, 206, 208 and 210, a controller 214, a limited number of consoles 216, 218 and 220, a bridge 224, a telephone interconnect terminal 212, a public switched telephone network ("PSTN") 226, the PSTN 226 being coupled to the telephone interconnect terminal 212 by one or more phone lines 230. Each of these elements are readily known in the art, thus no further discussion will be presented regarding their operation other than to further illustrate the present invention. Note that each radio network or sub-network must at least include one controller at any network node to establish communication between two or more communication units and network users. Further note that there may be multiple controllers at different nodes in the network such that each controller takes responsibility for different sub-networks of the network, where a sub-network is any subset of the total network nodes. Still further note that there is no requirement that a controller be responsible for the site at which it is located. For example, a network consisting of many nodes which are considered to encompass several sub-networks, may have all controllers located at the same node.

The repeaters 202, 204, 206, 208 and 210, the controller 214, the consoles 216, 218 and 220, the bridge 224 and the telephone interconnect terminal 212 are interconnected to a site local area network ("LAN") 222. The LAN, which is well known in the art, is used to link all of the devices to each other and to the controller. The LAN carries both control and communication message payloads. The bridge 224 is only used in networks having more than one network node and is used to interface all communication links between that node and other network nodes. Further, the repeaters, consoles, and the telephone interconnect terminal, is a controlled device as they receive commands from the controller 214. These commands include address assignment information and call selection information as further described below. The bridges 224 are capable of receiving network address and port information so that internal tables can be maintained to support the proper bridging of messages from message sources to message destinations.

Each controlled device that is connected to a site LAN, is assigned a permanent address. Bridges 224 are also assigned a permanent address. Each permanent address is unique throughout the communication system. Also, each permanent address never changes and is used to consistently target control commands to the controlled devices and bridges. It is a goal of the invention to use some simple cost-effective devices that only use one address to respond to control commands. Each controlled devices—and only such controlled devices—have both a permanent address and also a temporary address, each temporary address being assignable, on a temporary basis, by the controller. Thus, each controlled device uses a temporary address that may be different from its permanent address. The bridges 224 only use one address to respond to control commands. A temporary address is shared simultaneously by a subset of controlled devices when the subset is chosen to support a call message. It is also a goal of the invention to eliminate the potential for message blocking due to a limited number of temporary addresses being available. Therefore, temporary addresses will be the same as one of the unique permanent addresses of the controlled device subset chosen to support a given communication message. With several controlled devices sharing the same temporary address, configuration commands can be received quickly such that the source packets may be carried across the network towards the destinations. The temporary storage of a temporary address is done in existing memory within the controlled device. Note that communication links between network node bridges 224 may be dedicated circuits, or may be switched circuits established between bridges, which is well known in the art.

Figure 3:
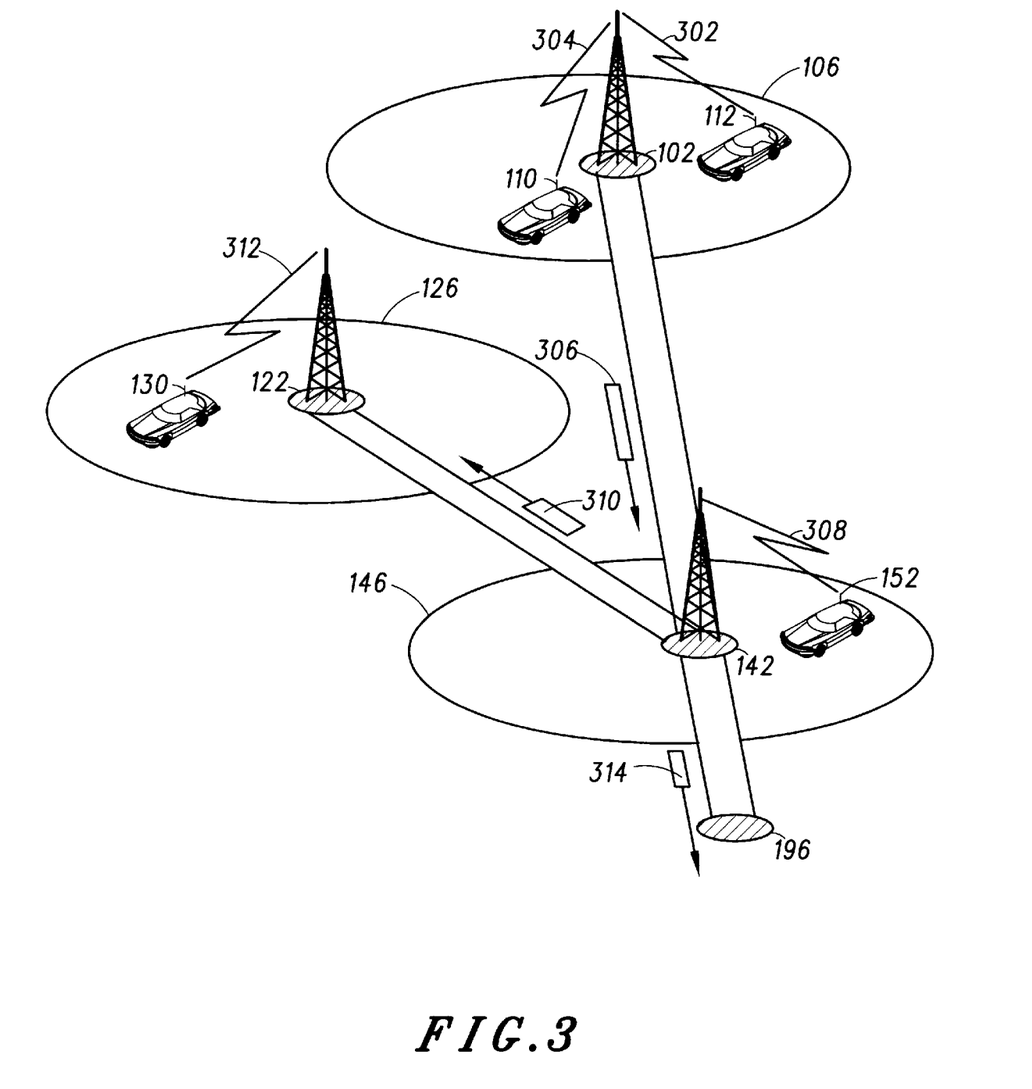
FIG. 3 shows the routing of a multi-site dispatch call in accordance with the present invention.

FIG. 3 illustrates the routing of a packet in a point-to-multipoint dispatch call with one active source. Assume that the vehicle-mounted communication units 110, 112, 152 and 130 are members of a common dispatch talk-group. The communication unit in vehicle 112 is portrayed as initiating a PTT transmission. The PTT transmission is responded to by at least one controller which assigns a repeater to receive the PTT transmission. The repeater receives the PTT transmission and places, in a digitized format, the PTT transmission on the site LAN.

The temporary address is determined by the controller when the call resources are assigned. Call resources include controlled devices, links, and bridges. The network communication paths are determined and the bridges 224 on those paths receive the temporary address and port information so the internal tables in the bridges can be updated. The same repeater assigned to receive the source will pull this message off the LAN and transmits it over the air to vehicle 110.

Since the assumed talk-group contains communication units located in different sites than that of the source communication unit, the communication from the PTT initiator 112 must be digitized, with an associated temporary address for this call, and placed onto the site LAN as a sequence of packets, by a repeater at node 102. These packets will be transmitted over the inter-node link 306 to node 142. The bridge 224 at node 102 receives the sequence of packets and retransmits them on the link to node 142 since the packets are associated with a temporary address that has been assigned at the node 142, or beyond as indicated by a previous entry in the internal bridge table that correlates bridge ports to network addresses that should pass to that port. As shown, there is a talk-group member in the coverage area 146 of node 142, thus the packets will be transferred over the LAN at node 142 to one of that node's repeaters, for broadcast 308 to the communication unit 152. Since the assumed talk-group also contains a communication unit 130 in the coverage area 126 of node 122, the packets 306 received at node 142, are also transferred over another inter-node link 310 to node 122. At node 122 the packets 310 may be transferred over the LAN to one of that node's repeaters, for broadcast 312 to the communication unit 130.

Further assume that a dispatch console is at node 196 and is a member of the assumed talk-group such that the packets 306 received at node 142, are transferred over another inter-node link 314 to node 196. At node 196 they may be transferred over the LAN to a dispatch console.

Figure 4:
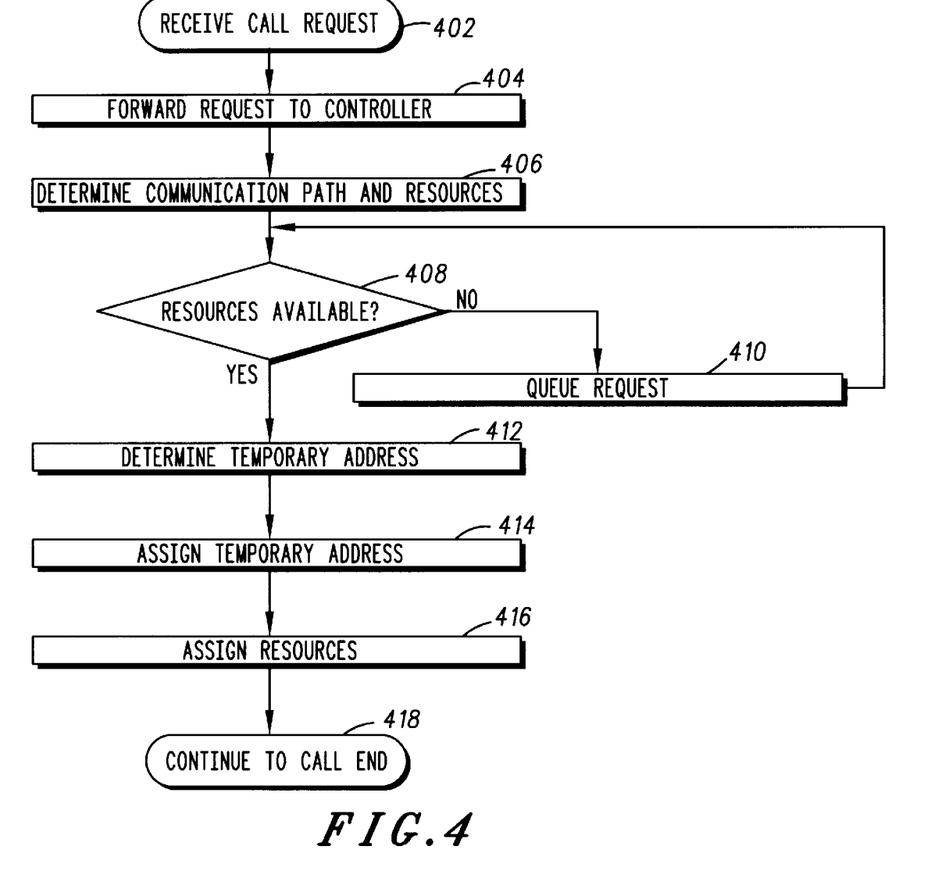
FIG. 4 is a flow diagram for establishing a multi-site call in accordance with the present invention.
Figure 5:
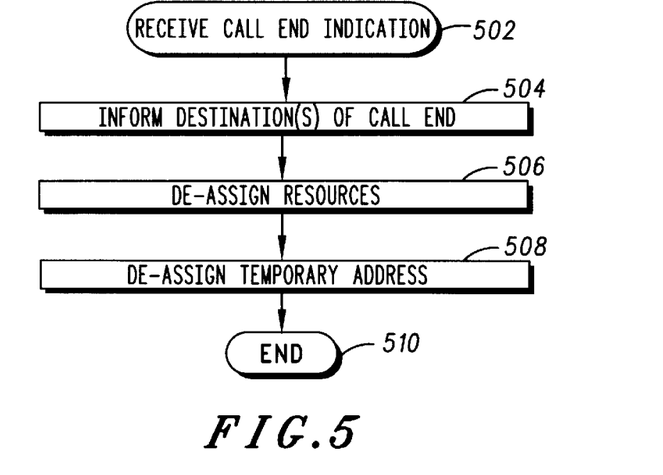
FIG. 5 is a flow diagram for ending a multi-site call in accordance with the present invention.

Referring now to FIGS. 4–5, the process depicted therein is directed to the communication system of FIGS. 1–2 or, generally, to a communication system having a controller, a plurality of site nodes linked by a plurality of LAN bridges, each site node having a plurality of controlled devices for selectively linking communication sources with communication destinations, each LAN bridge having a permanent address, each controlled device having a permanent address and a temporary address, each permanent address being unique in the communication system, each temporary address being assignable, a method for supporting a call from one or more source communication units to one or more destination communication units.

FIG. 4 depicts the call assignment (or set-up) process.

The process begins at step 402, when the communication system receives a call request generated by a source communication unit. The source communication unit may be supported by a radio site or from a wireline dispatch position connected to one of the site node LANs. The call request includes the identity of the source communication unit, the type of call service desired, the identity of the destination communication units, and a message. The call request is received by one of the controlled devices of the network.

The process then goes to step 404. In step 404, the call request is forwarded to the controller by encapsulating the call request into a packet. The packet targets the permanent address of the controller and is carried to the controller by the LAN and bridging network.

The process next goes to step 406. In step 406, the controller determines the communication path and resources needed to support the call. This step 406 includes a step of, by the controller, from the plurality of controlled devices, determining a set of controlled devices to support the call, and a step of, by the controller, determining at least one path linking the set of controlled devices, and a step of, by the controller, based on the at least one path, from the plurality of LAN bridges, determining a set of LAN bridges to support the call.

The resources are determined by reviewing an internally stored list of target destination communication units and console positions to arrive at where radio and LAN network resources will be required. The communication path is the trail of controlled devices, and links that are followed to go from the source controlled device to the destination controlled devices. The communication path is determined to reveal which bridges are to be used and which ports connected to these bridges.

The process then goes to step 408. In step 408, the controller determines whether the resources determined in step 406 are available for the call to proceed. Thus, the step 408 includes a step of, by the controller, determining whether the set of controlled devices (from step 406 above), the at least one path (from step 406 above), and the set of LAN bridges (from step 406 above) are available to support the call.

If the result of this determining step 408 is negative (the resources needed for the call to proceed are NOT available), the process goes to step 410. In contrast, if the result of this determining step 408 is positive (the resources needed for the call to proceed ARE available), the process goes to step 412.

From above, when step 408 determines that the resources needed for the call to proceed are NOT available, the process goes to step 410. In step 410, responsive to the controller determining that the resources, the resources comprising the set of controlled devices, the at least one path, and the set of LAN bridges, are NOT available for the call to proceed, the controller queues the call request until resources become available for the call to proceed. Thus, responsive to the controller determining that resources are NOT presently available for the call to proceed, step 410 includes a step, by the controller, of queuing the call request while continuing to re-check the availability of the resources until the resources are finally available for assignment.

For example, from the above discussion regarding the assumed talk-group, the controller determines, by a table look-up of destination positions, that destination communication units 130 and 152 are located in sites having coverage areas 126 and 146. After determining the location of destination units, the controller determines whether a repeater is available in each of the sites. If the repeater is not available in each site, the call is placed in the queue until the repeaters become available. Note that other call processing techniques may incorporated when at least one repeater is not available in a site. For example, the call could proceed in the sites that have a repeater available and add the others sites when a repeater becomes available.

From above, when step 408 determines that the resources needed for the call to proceed ARE available, the process goes to step 412. This step 412 includes a step of, by the controller, determining a call temporary address that is identical to the permanent address of one member of the set of controlled devices. The temporary address may comprise the permanent address of the controlled device linking the communication source, such as a repeater or dispatch console, or it may be the permanent address of the controlled device linking one of the communication destinations, such as a repeater or dispatch console.

The process then proceeds to step 414. This step 414 includes a step of, by the controller, using the permanent addresses corresponding to the set of controlled devices, assigning the temporary address to the set of controlled devices. All of the controlled devices required to support this new call are assigned the same temporary address so that they will all respond simultaneously to the message packets being carried from the one or more source communication units to the one or more destination communication units. This assignment is made when the controller sends individual messages carried on the network using the permanent addresses of the plurality of targeted controlled devices. The messages contain information as to the temporary address number.

The communication path information reveals which bridges are to be used and which ports connected to these bridges. The path may comprise many paths of links and bridges. Numerous paths may be required for the numerous destinations. The controller communicates information to the set of the LAN bridges along the communication path, using the permanent addresses, which information includes path information identifying at least a portion of the communication path, and the temporary address. Further, the path information may contain port information so that the bridge can store the temporary addresses to pass on a port-by-port basis.

The process next proceeds to step 416, where the remaining resources are assigned to support the call. This step 416 includes a step of, by the controller, using the permanent address corresponding to the set of LAN bridges, assigning the call temporary address to the set of LAN bridges, and then sending path information to the set of LAN bridges, the path information based on the at least one path.

Moreover, once the call temporary address has been assigned to the controlled devices, and with the bridges configured to pass messages down the right paths according to the temporary addresses, the required controlled devices are assigned to the call. The assignment information, sourced from the controller, may sent in individual messages carried on the network using the permanent addresses of the targeted controlled devices, or the assignment message may be sent in a single message to all of the targeted controlled devices simultaneously carried on the network using the temporary address previously assigned.

The process next proceeds to step 418. This step 418 includes a step of, by each member of the set of controlled devices, using the call temporary address for supporting the call. With the controlled devices assigned to the call, the site assigned repeaters transmit a call assignment message to the destination communication unit(s) and the source communication unit begins transmitting its message until the call phase continues to the call-end process.

Prior to ending the call, the source communication unit transmits its message as follows. The source message is received by the controlled device resource assigned to the source communication unit. The message is digitized and converted into a stream of packets suitable to be placed on a site LAN as is known in the art. The packets are then routed, via the LAN network, to the controlled devices in the sites that have a destination communication unit located within it (target control devices) by sending the packets to the temporary address assigned to this call.

The stream of message packets arrives at a target controlled device network resource, such as a repeater serving one or more communication units or perhaps a console position. The message is forwarded over-the-air to the destination communication unit from the repeater transmitter.

FIG. 5 illustrates the call end (or tear-down) process.

The process begins at step 502, where the controller determines that the call has ended. This determining step 502 includes a step of, by the controller, receiving a call end indication generated by one of the controlled devices and forwarded to the controller. The controlled device forwards the call end indication to the controller via its permanent address over the LAN network. The call end is normally received from the last unit transmitting at the conclusion of its transmission.

The process then goes to step 504. Step 504 includes a step of, by the controller, using the temporary address, sending a call-end message to the set of controlled devices, wherein the call-end message instructs the set of controlled devices to inform the one or more destination communication units that the call has ended. The controller sends a message to all of the controlled network devices, using the temporary address, that are serving a destination unit to signal, the destination units that the call is ending.

The process then goes to step 506. In step 506, the controller also sends out a message, using the temporary address, to all of the assigned controlled network device resources that they are now de-assigned. The controller also sends out messages, using their permanent addresses, to all of the assigned bridge resources that they are now de-assigned for that call in the sense that the temporary address need not be carried down a particular path by a particular bridge port. The bridges will stop transferring messages for this call, but they won't stop transferring messages for the single controlled device that still uses the temporary address number that was chosen for the call.

Thus, step 506 includes a step of, by the controller, sending a first de-assigning message to the set of controlled devices, using the temporary address, the first de-assigning message informing the set of controlled devices that they are now de-assigned from the call. Also, step 506 includes a subsequent step of, by the controller, sending a second de-assigning message to the set of LAN bridges, using the permanent addresses corresponding to the set of LAN bridges, the second de-assigning message informing the set of LAN bridges that they are now de-assigned from the call.

The process then goes to step 508. This step 508 includes a step of, by the controller, providing each member of the set of controlled devices with a third de-assigning message instructing the member to disregard the temporary address. Moreover, the temporary address is de-assigned, in the sense that the controller may choose to use this address number for a new call.

The process now goes to step 510, where the process ends.

In a first embodiment, the call temporary address further comprises the permanent address of a controlled device linking one of the one or more communication sources.

In a second embodiment, the call temporary address further comprises the permanent address of a controlled device linking one of the one or more communication destinations.

In summary, the present invention allows a source message to be carried to multiple destinations to support one-to-many group dispatch with only moving a minimum of traffic on the network and without requiring additional network addresses, beyond those permanently assigned to the controlled devices, to be available for use as a temporary address. By temporarily re-using a unique permanent address of one of the assigned controlled devices, more addresses are available to be assigned to still further controlled devices, thus creating the opportunity for larger communication system networks without the potential of call blocking due to an inadequate supply of network addresses. In addition, by reducing the total number of required communication system addresses, the destination address field can contain fewer digits. Fewer digits take less time to transmit, thus improved response times are provided. As well, by temporarily re-using a unique permanent address of one of the assigned controlled devices, the source controlled device does not have to send a duplicate copy of the message packets to each destination by using a unique address for each required destination. That would seriously impact the traffic volume carried on the network slowing response times even further. Another undesired alternative would be to simply broadcast the message to all LANs across all bridges. That too would create an overload of network traffic.

While various embodiments of a method for dynamic routing of communication messages, in accordance with the present invention, have been described hereinabove, the scope of the invention is defined by the following claims.

What is claimed is:

1. In a communication system having a controller, a plurality of site nodes linked by a plurality of LAN bridges, each site node having a plurality of controlled devices for selectively linking communication sources with communication destinations, each LAN bridge having a permanent address, each controlled device having a permanent address and a temporary address, each permanent address being unique in the communication system, each temporary address being assignable, a method for supporting a call from one or more source communication units to one or more destination communication units, the method comprising the steps of, responsive to a call request generated by a source communication unit:

A) by the controller, from the plurality of controlled devices, determining a set of controlled devices to support the call;

B) by the controller, determining at least one path linking the set of controlled devices;

C) by the controller, based on the at least one path, from the plurality of LAN bridges, determining a set of LAN bridges to support the call;

D) by the controller, determining a call temporary address that is identical to the permanent address of one member of the set of controlled devices;

E) by the controller, using the permanent addresses corresponding to the set of controlled devices, assigning the call temporary address to the set of controlled devices;

F) by the controller, using the permanent addresses corresponding to the set of LAN bridges, assigning the call temporary address to the set of LAN bridges, and then sending path information to the set of LAN bridges, the path information based on the at least one path; and, G) by each member of the set of controlled devices, using the call temporary address for supporting the call.

2. The method of claim 1 including a further step of:

H) by the controller, determining that the call has ended.

3. The method of claim 2, wherein step H) includes a step of, by the controller, receiving a call end indication generated by one of the controlled devices and forwarded to the controller.

4. The method of claim 2 including a further step of:

I) by the controller, using the temporary address, sending a call-end message to the set of controlled devices.

5. The method of claim 4, wherein the call-end message instructs the set of controlled devices to inform the one or more destination communication units that the call has ended.

6. The method of claim 4 including a further step of:

J) by the controller, sending a first de-assigning message to the set of controlled devices, using the temporary address, the first de-assigning message informing the set of controlled devices that they are now de-assigned from the call.

7. The method of claim 6 including a further step of:

K) by the controller, sending a second de-assigning message to the set of LAN bridges, using the permanent addresses corresponding to the set of LAN bridges, the second de-assigning message informing the set of LAN bridges that they are now de-assigned from the call.

8. The method of claim 7 including a further step of:

L) by the controller, providing each member of the set of controlled devices with a third de-assigning message instructing the member to disregard the temporary address.

9. The method of claim 1, the call temporary address further comprises the permanent address of a controlled device linking one of the one or more communication sources.

10. The method of claim 1, the call temporary address further comprises the permanent address of a controlled device linking one of the one or more communication destinations.

11. The method of claim 1, including a preliminary step of, by the controller, determining whether the set of controlled devices, the at least one path, and the set of LAN bridges are available to support the call.

12. The method of claim 11, including a further step of, responsive to the controller determining that the set of controlled devices, the at least one path, and the set of LAN bridges are not available for the call to proceed, by the controller, queuing the call request.

13. The method of claim 1, wherein the communication system is a land mobile trunked radio system.

14. The method of claim 1, wherein the call is a group dispatch call.

* * * * *